US007984783B2

(12) United States Patent
Gray, Jr. et al.

(10) Patent No.: US 7,984,783 B2
(45) Date of Patent: Jul. 26, 2011

(54) HYDRAULIC HYBRID VEHICLE WITH INTEGRATED HYDRAULIC DRIVE MODULE AND FOUR-WHEEL-DRIVE, AND METHOD OF OPERATION THEREOF

(75) Inventors: Charles L. Gray, Jr., Pickney, MI (US); Daniel W. Barba, New Hudson, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 299 days.

(21) Appl. No.: 12/229,099

(22) Filed: Aug. 19, 2008

(65) Prior Publication Data

US 2008/0314039 A1 Dec. 25, 2008

Related U.S. Application Data

(60) Division of application No. 11/891,869, filed on Aug. 13, 2007, now Pat. No. 7,537,075, which is a division of application No. 10/769,459, filed on Jan. 30, 2004, now Pat. No. 7,337,869, which is a continuation-in-part of application No. 10/620,726, filed on Jul. 15, 2003, now Pat. No. 7,374,005, which is a continuation-in-part of application No. 09/479,844, filed on Jan. 10, 2000, now Pat. No. 6,719,080.

(51) Int. Cl.
*B60K 17/08* (2006.01)
*B60K 17/354* (2006.01)
*B60L 11/16* (2006.01)
(52) U.S. Cl. .................. 180/307; 180/165; 180/305
(58) Field of Classification Search .................. 180/165, 180/305, 307, 308
See application file for complete search history.

(56) References Cited

U.S. PATENT DOCUMENTS 2,875,701 A 3/1959 Ebert ........................... 103/162
(Continued)

FOREIGN PATENT DOCUMENTS

CH 325587 12/1957
(Continued)

OTHER PUBLICATIONS

Fendt Vario TMS, as Illustrated in the Enclosed Photos and Printed Publications, Apr. 2003.

*Primary Examiner* — Hau V Phan
*Assistant Examiner* — John R Olszewski
(74) *Attorney, Agent, or Firm* — Seed Intellectual Property Law Group PLLC

(57) ABSTRACT

A vehicle includes an integrated drive module coupled to an axle thereof. The module includes a hydraulic motor configured to provide motive power at an output shaft, and a differential for distributing the motive power to right and left portions of the axle. The hydraulic motor and the differential are encased within a common housing. The vehicle may include a second integrated drive module having, within a housing, a second hydraulic motor (or multiple hydraulic motors), and a second differential coupled thereto and configured to distribute motive power to right and left portions of a second axle. The second module may also include a transmission within the same housing. The transmission may be a two speed or other multi-speed transmission. The second module is configured to operate in neutral while power demand is below a threshold, and to engage while the power demand exceeds the threshold. The second module may be configured to remain engaged for full-time four-wheel-drive operation.

11 Claims, 6 Drawing Sheets

U.S. PATENT DOCUMENTS

| | | | |
|---|---|---|---|
| 2,956,407 A | 10/1960 | Grabow | 60/53 |
| 2,967,395 A | 1/1961 | Foerster | 60/53 |
| 3,065,700 A * | 11/1962 | Blenkle | 92/12.2 |
| 3,081,647 A | 3/1963 | Blenkle | 74/710.5 |
| 3,142,964 A | 8/1964 | Thoma et al. | 60/53 |
| 3,442,181 A | 5/1969 | Olderaan | 92/57 |
| 3,587,404 A | 6/1971 | Kratzenberg | 91/505 |
| 3,602,105 A | 8/1971 | Slusher | 91/483 |
| 3,656,408 A | 4/1972 | Fox | 91/500 |
| 3,760,692 A | 9/1973 | Molly | 91/505 |
| 3,775,981 A | 12/1973 | Molly | 60/490 |
| 3,898,811 A | 8/1975 | Seaberg | 60/421 |
| 3,900,075 A | 8/1975 | Chichester et al. | 180/6.3 |
| 3,960,284 A | 6/1976 | Carpenter | 214/138 R |
| 3,978,937 A | 9/1976 | Chichester et al. | 180/44 F |
| 3,999,466 A | 12/1976 | Aschke | 91/499 |
| 4,018,052 A | 4/1977 | Laussermair | 60/414 |
| 4,075,843 A | 2/1978 | Leker | 60/487 |
| 4,098,083 A | 7/1978 | Carman | 60/414 |
| 4,098,144 A | 7/1978 | Besel et al. | 74/687 |
| 4,129,102 A | 12/1978 | van der Lely | 123/51 B |
| 4,223,532 A | 9/1980 | Shiber | 60/414 |
| 4,252,508 A | 2/1981 | Forster | 417/429 |
| 4,271,725 A | 6/1981 | Takao et al. | 74/730 |
| 4,285,303 A | 8/1981 | Leach | 123/51 BA |
| 4,297,086 A | 10/1981 | McGowan | 417/271 |
| 4,355,506 A | 10/1982 | Leonard | 60/389 |
| 4,487,108 A | 12/1984 | McLuen | 91/504 |
| 4,495,768 A | 1/1985 | Valavaara | 60/414 |
| 4,561,250 A | 12/1985 | Aoyagi et al. | 60/430 |
| 4,669,267 A | 6/1987 | Greenhow | 60/490 |
| 4,747,266 A | 5/1988 | Cadée | 60/325 |
| 4,763,472 A | 8/1988 | McGowan | 60/403 |
| 4,770,084 A | 9/1988 | Miwa et al. | 91/501 |
| 4,813,234 A | 3/1989 | Nikolaus | 60/484 |
| 4,872,394 A | 10/1989 | Nakagawa et al. | 91/506 |
| 4,888,949 A | 12/1989 | Rogers | 60/434 |
| 4,896,564 A | 1/1990 | Eickmann | 74/682 |
| 5,085,053 A | 2/1992 | Hayashi et al. | 60/488 |
| 5,151,068 A | 9/1992 | Mann et al. | 475/322 |
| 5,269,142 A | 12/1993 | Atake | 60/484 |
| 5,403,244 A | 4/1995 | Tankersley et al. | 477/20 |
| 5,406,794 A | 4/1995 | Litz | 60/483 |
| 5,423,183 A | 6/1995 | Folsom | 60/492 |
| 5,435,794 A | 7/1995 | Mori et al. | 475/83 |
| 5,495,912 A | 3/1996 | Gray, Jr. et al. | 180/165 |
| 5,505,527 A | 4/1996 | Gray, Jr. et al. | 303/3 |
| 5,507,144 A | 4/1996 | Gray, Jr. et al. | 60/327 |
| 5,549,087 A | 8/1996 | Gray, Jr. et al. | 123/254 |
| 5,562,079 A | 10/1996 | Gray, Jr. | 123/276 |
| 5,579,640 A | 12/1996 | Gray, Jr. | 60/413 |
| 5,599,163 A | 2/1997 | Heath et al. | 415/55.1 |
| 5,609,131 A | 3/1997 | Gray, Jr. et al. | 123/299 |
| 5,611,300 A | 3/1997 | Gray, Jr. | 123/48 A |
| 5,617,823 A | 4/1997 | Gray, Jr. et al. | 123/254 |
| 5,625,204 A | 4/1997 | Kao et al. | 257/190 |
| 5,634,526 A | 6/1997 | Johnson | 180/305 |
| 5,647,249 A * | 7/1997 | Okada et al. | 74/606 R |
| 5,752,417 A | 5/1998 | Okada et al. | 74/606 R |
| 5,768,955 A * | 6/1998 | Hauser | 74/606 R |
| 5,802,851 A | 9/1998 | Krantz | 60/487 |
| 5,827,148 A | 10/1998 | Seto et al. | 477/15 |
| 5,845,732 A | 12/1998 | Taniguchi et al. | 180/65.6 |
| 5,887,674 A * | 3/1999 | Gray, Jr. | 180/307 |
| 5,967,927 A | 10/1999 | Imamura et al. | 475/83 |
| 5,971,092 A * | 10/1999 | Walker | 180/308 |
| 6,107,761 A | 8/2000 | Seto et al. | 318/139 |
| 6,151,990 A | 11/2000 | Johnson et al. | 74/606 R |
| 6,152,846 A | 11/2000 | Schreier et al. | 475/83 |
| 6,170,524 B1 | 1/2001 | Gray, Jr. | 137/625.18 |
| 6,186,126 B1 | 2/2001 | Gray, Jr. | 123/557 |
| 6,189,493 B1 | 2/2001 | Gray, Jr. | 123/52.4 |
| 6,202,416 B1 | 3/2001 | Gray, Jr. | 60/620 |
| 6,213,727 B1 | 4/2001 | Kawaguchi | 417/222.2 |
| 6,216,462 B1 | 4/2001 | Gray, Jr. | 60/616 |
| 6,260,468 B1 | 7/2001 | Ryken et al. | 91/506 |
| 6,272,950 B1 | 8/2001 | Braun et al. | 74/731.1 |
| 6,283,009 B1 | 9/2001 | Hayashi et al. | 92/71 |
| 6,301,888 B1 | 10/2001 | Gray, Jr. | 60/605.2 |
| 6,301,891 B2 | 10/2001 | Gray, Jr. | 60/616 |
| 6,358,174 B1 | 3/2002 | Folsom et al. | 475/72 |
| 6,375,592 B1 | 4/2002 | Takahashi et al. | 475/262 |
| 6,413,181 B2 | 7/2002 | Okada | 475/83 |
| 6,415,607 B1 | 7/2002 | Gray, Jr. | 60/616 |
| 6,481,314 B2 | 11/2002 | Nemoto et al. | |
| 6,499,549 B2 | 12/2002 | Mizon et al. | 180/65.6 |
| 6,521,225 B1 * | 2/2003 | Srivastava et al. | 424/93.2 |
| 6,575,872 B2 | 6/2003 | Gluck et al. | 477/68 |
| 6,589,128 B2 | 7/2003 | Bowen | 475/5 |
| 6,601,474 B2 | 8/2003 | Ishimaru et al. | |
| 6,626,785 B2 | 9/2003 | Pollman | 475/82 |
| 6,626,787 B2 | 9/2003 | Porter | 475/221 |
| 6,628,021 B2 | 9/2003 | Shinohara et al. | 310/68 B |
| 6,719,080 B1 | 4/2004 | Gray, Jr. | 180/165 |
| 6,821,225 B2 | 11/2004 | Ishii | 475/74 |
| 7,374,005 B2 | 5/2008 | Gray, Jr. | |
| 2002/0094909 A1 | 7/2002 | Gluck et al. | 477/52 |
| 2002/0173398 A1 | 11/2002 | Arnold et al. | 475/72 |
| 2003/0192402 A1 | 10/2003 | Arnold et al. | 74/730.1 |
| 2003/0207733 A1 | 11/2003 | Ishimaru et al. | 475/83 |
| 2004/0011031 A1 | 1/2004 | Gray, Jr. | 60/325 |
| 2004/0149506 A1 | 8/2004 | Sakikawa et al. | 180/242 |
| 2004/0172939 A1 | 9/2004 | Abend et al. | 60/487 |
| 2004/0173089 A1 | 9/2004 | Gray, Jr. et al. | 91/505 |
| 2004/0178635 A1 | 9/2004 | Gray, Jr. | 290/40 C |
| 2005/0119084 A1 | 6/2005 | Ishii et al. | 475/83 |
| 2005/0176549 A1 | 8/2005 | Okada | 475/221 |
| 2005/0217262 A1 | 10/2005 | Takada et al. | 60/468 |
| 2006/0021813 A1 | 2/2006 | Gray, Jr. | 180/165 |
| 2006/0026957 A1 | 2/2006 | Hauser et al. | 60/487 |
| 2006/0070376 A1 | 4/2006 | Okada | 60/433 |

FOREIGN PATENT DOCUMENTS

| | | |
|---|---|---|
| CN | 1035873 | 9/1989 |
| DE | 1 528 469 | 4/1971 |
| DE | 2 101 963 | 7/1972 |
| DE | 26 49 127 | 5/1978 |
| EP | 0 417 820 B1 | 6/1995 |
| EP | 1 092 870 A2 | 4/2001 |
| EP | 1 114 948 A2 | 7/2001 |
| GB | 992334 | 5/1965 |
| GB | 1178256 | 1/1970 |
| JP | 07002286 A | 1/1995 |
| JP | 9235640 A | 9/1997 |
| JP | 2001-47287 | 2/2001 |
| JP | 2001193830 A | 7/2001 |
| JP | 2002067718 A | 3/2002 |
| JP | 2003014080 A | 1/2003 |
| JP | 2003519595 A | 6/2003 |
| JP | 2004255918 A | 9/2004 |
| WO | 01/51870 A1 | 7/2001 |

* cited by examiner

HYDRAULIC HYBRID VEHICLE WITH INTEGRATED HYDRAULIC DRIVE MODULE AND FOUR-WHEEL-DRIVE, AND METHOD OF OPERATION THEREOF

CROSS-REFERENCES TO RELATED APPLICATIONS

This application is a divisional of U.S. patent application Ser. No. 11/891,869, "Hydraulic Hybrid Vehicle With Integrated Hydraulic Drive Module and Four-Wheel-Drive, and Method of Operation Thereof," filed Aug. 13, 2007, now pending, which is a divisional of U.S. patent application Ser. No. 10/769,459, "Hydraulic Hybrid Vehicle With Integrated Hydraulic Drive Module and Four-Wheel-Drive, and Method of Operation Thereof," filed Jan. 30, 2004, now issued as U.S. Pat. No. 7,337,869, which is a continuation-in-part of U.S. patent application Ser. No. 10/620,726, "Opposing Pump/Motors," filed Jul. 15, 2003, now issued as U.S. Pat. No. 7,374,005, which is a continuation-in-part of U.S. patent application Ser. No. 09/479,844, "Hydraulic Hybrid Vehicle," filed Jan. 10, 2000, now issued as U.S. Pat. No. 6,719,080, all of which applications are incorporated herein by reference in their entirety.

BACKGROUND OF THE INVENTION

1. Field of the Invention

This application is directed to hydraulic hybrid vehicle technology, and in particular to a drive system thereof.

2. Description of the Related Art

Significant interest has been generated, in recent years, in hybrid vehicle technology as a way to improve fuel economy and reduce the environmental impact of the large number of vehicles in operation. The term hybrid is used in reference to vehicles employing two or more power sources to provide motive energy to the vehicle. For example, hybrid electric vehicles are currently available that employ an internal combustion engine to provide power to a generator, which then generates electricity to be stored in a battery or storage cells. This stored power is then used, as necessary, to drive an electric motor coupled to the drive train of the vehicle.

There is also interest in the development of hybrid hydraulic vehicles, due to the potential for greater fuel economy, and a lower environmental impact than hybrid electric vehicles. Inasmuch as the present invention is directed to innovations and improvements in hybrid hydraulic technology, where reference is made to hybrid vehicles, or hybrid technology, it may be assumed that the reference is directed to hydraulic hybrids in particular, unless otherwise noted.

Hybrid vehicles may be grouped into two general classes, namely, parallel hybrid and series hybrid vehicles. Parallel hybrid vehicles are vehicles employing a more or less typical engine, transmission, and drive train, with hydraulic components operating alongside. For example, FIG. 1 shows what is commonly referred to as a launch assisted vehicle 100. The vehicle 100, shown in wire-frame to illustrate selected components, includes an internal combustion engine 102, a transmission 104, a drive shaft 106, differential 108, drive axle 110, and drive wheels 112, as may be found in conventional vehicles. However, the vehicle 100 also includes a hydraulic pump/motor 114, in this case coupled to the drive shaft 106, and high and low pressure hydraulic accumulators 116, 118.

A hydraulic pump/motor is a device that functions as a motor when fluid from a high-pressure fluid source is used to impart rotational force to an output shaft. On the other hand, if rotational force is applied from an external source to rotate the shaft, the device may be used as a pump, to pump fluid from a low pressure fluid source to high pressure.

During normal operation, the vehicle 100 operates in a manner similar to conventional vehicles. However, when the vehicle operator applies the brake, the pump/motor 114 is coupled to the drive shaft 106 such that rotation of the drive shaft 106 provides energy to draw fluid from the low pressure accumulator 118 and pump the fluid at high pressure to the high pressure accumulator 116. Engagement of the pump/motor 114 in this manner creates drag on the drive shaft, which is transferred to the drive wheels 112, slowing the vehicle 100. In this way, a portion of kinetic energy of the moving vehicle is recovered and stored as hydraulic fluid under pressure. When the vehicle 100 is pulling away from a stop, or accelerating, the pump/motor 114 is again coupled to the drive shaft 106, while the pump/motor 114 is switched to motor mode, in which pressurized fluid drives the pump/motor 114, which in turn adds rotational energy, or torque, to the drive shaft 106. In this way, the pump/motor is utilized in these two modes such that energy that would otherwise be lost to friction in the brakes of the vehicle is stored, to be released later to assist the vehicle 100 in accelerating.

According to another parallel hybrid scheme, the engine of a vehicle is used to drive a pump to pump fluid at high pressure into an accumulator. This is done during periods when the vehicle is cruising at a steady speed, or otherwise demanding less than the engine is capable of providing when operating at its most efficient load.

It is known that internal combustion engines used in motor vehicles are required to have a maximum output capacity that far exceeds the average requirements of the vehicle, inasmuch as such vehicles occasionally require power output levels far exceeding the average power output. For example, during acceleration from a stop, or for passing, etc., much more power is required than during periods when the vehicle is cruising at a steady speed.

By using excess capacity of the engine to drive the fluid pump, the load on the engine can be increased to a point where the engine operates at a high level of fuel efficiency, while the excess energy is stored as pressurized fluid. Again, the energy stored as pressurized fluid may then be used to supplement the engine during periods when power requirements of the vehicle exceed the engine's maximum efficient output. This scheme may be implemented using a configuration similar to that shown in FIG. 1, in which the single pump/motor 114 is used to provide all the pumping and motoring function, or a second hydraulic pump may be provided, which is configured solely to be coupled to the engine 102 for the purpose of pumping fluid to the high pressure accumulator 116.

Other parallel hybrid configurations are also known in the art, and will not be discussed in detail here.

Series hybrid vehicles have no direct mechanical link between the engine and the drive wheels of the vehicle. They do not employ a transmission or drive shaft as described with reference to parallel hybrid vehicles. In a series hybrid vehicle, a hydraulic pump is coupled directly to the crankshaft of the engine of the vehicle. All of the energy output of the engine is used to pump fluid from a low pressure accumulator to a high pressure accumulator. A second pump/motor is coupled to the drive wheels of the vehicle, and is driven by pressurized fluid from the high pressure accumulator. In such a vehicle, the engine may be operated with a load, and at a speed selected to provide maximum efficiency and fuel economy, without regard to the constantly varying speed of the vehicle itself.

The configuration and operation of parallel and series hybrid vehicles are described in detail in the following references: U.S. Pat. No. 5,887,674, U.S. patent application Ser. No. 09/479,844, and U.S. patent application Ser. No. 10/386,029, all of which are incorporated herein by reference, in their entirety.

Although hydraulic drive equipment has been used on commercial and off-road equipment and mobile devices for many years, hydraulic drive equipment has not yet found successful commercial application for on-road, private and multi-passenger vehicles as part of a "hybrid" powertrain. Such lack of implementation of hydraulic drive equipment in passenger vehicles has thus far prevailed in the prior art despite the tremendous fuel economy benefits that could be obtained for such vehicles through use of a hydraulic hybrid powertrain. As is known in the art, a principal obstacle to implementation of hydraulic drive equipment in passenger vehicles as a hybrid powertrain is the challenge of packaging the added hydraulic equipment (e.g., pump(s), motor(s), accumulators, hoses) in addition to conventional drivetrain components (e.g., engine, transmission, differential, etc.) into the very limited space generally available to such components in conventional passenger vehicle frames and styles. Furthermore, the increase in cost and weight created by the addition of hydraulic equipment to the conventional drivetrain components in such vehicles somewhat offsets the benefits of a hydraulic hybrid drivetrain, by reducing the fuel economy benefits of the technology (due to increased vehicle weight) while simultaneously increasing vehicle cost.

BRIEF SUMMARY OF THE INVENTION

According to the principles of the invention, the obstacles in the prior art are alleviated, by reducing the size, weight and/or number of overall components required for creation of a commercially acceptable hydraulic hybrid drive passenger vehicle, and thereby allow packaging in a passenger vehicle, at a reduced weight and cost.

According to an embodiment of the invention, an integrated drive module, for providing motive power to a vehicle, is provided, having a machine casing, within which a hydraulic motor is enclosed, configured to convert energy in the form of pressurized fluid, to energy in the form of torque applied to an output shaft of the motor. A differential, also enclosed within the casing, is coupled to the output shaft of the motor and configured to distribute the torque to right and left drive axle segments. The drive module may also include a multi-speed transmission enclosed within the casing and coupled between the output shaft and the differential.

According to another embodiment of the invention, the integrated drive module is configured to provide regenerative braking, by placing the hydraulic motor in a pump configuration to use torque at the drive axle segments to pressurize fluid.

According to another embodiment of the invention, a vehicle is provided, having a plurality of axles, with each axle having a plurality of wheels coupled thereto. The vehicle also includes an integrated drive module coupled to one of the plurality of axles. The module includes a hydraulic motor configured to provide motive power at an output shaft thereof, and a differential coupled to the output shaft and configured to distribute the motive power to right and left portions of the axle. The first hydraulic motor and the first differential are encased within a common housing.

According to another embodiment of the invention, the vehicle includes a second integrated drive module having, within a housing, a hydraulic motor and a differential coupled to the motor and configured to distribute motive power to right and left portions of a second one of the plurality of axles. The second module may also include a transmission within the same housing. The second module may be configured to operate in a neutral mode while a power demand is below a selected threshold, and to operate in an active mode, providing motive power to the second axle, while the power demand exceeds the selected threshold. Alternatively, the second module may be configured to operate in the active mode regardless of the power demand relative to the selected threshold.

According to an additional embodiment of the invention, a method for achieving a smooth transition between a 1:1 gear ratio and a high gear ratio (e.g., 3:1) with just one transmission step change is provided. The method includes sensing an increase in demand for motive power from a vehicle, applying an increased amount of torque from a hydraulic motor to an output shaft of the motor, responsive to the increased demand for motive power, transmitting the torque from the output shaft of the hydraulic motor to a differential through an operatively connected multi-speed transmission engaged in a first gear ratio, and distributing the torque to right and left drive axle segments of the vehicle through the differential, the differential being enclosed within a common housing with the hydraulic motor and multi-speed transmission, and the housing being attached to the vehicle.

The method also includes destroking the hydraulic motor for a selected time interval to temporarily reduce the amount of torque supplied by the hydraulic motor during that time interval, changing the gear ratio of the multi-speed transmission from the first gear ratio to a second gear ratio in conjunction with the time interval, and restroking the hydraulic motor to again increase the amount of torque supplied by the hydraulic motor responsive to a continued demand for motive power from the vehicle.

BRIEF DESCRIPTION OF THE SEVERAL VIEWS OF THE DRAWING(S)

DETAILED DESCRIPTION OF THE INVENTION

It will be recognized that a hydraulic hybrid vehicle uses several components that are not found in a conventional vehicle. For example, such vehicles employ at least one, and frequently two or more, pump/motors. In addition, high and low pressure accumulators are used, as well as switching valves and plumbing. Offsetting this additional equipment, in some cases, is the elimination of a drive shaft and a transmission. Nevertheless, it will be recognized that any reduction in weight will result in improved fuel economy.

Figure 1:
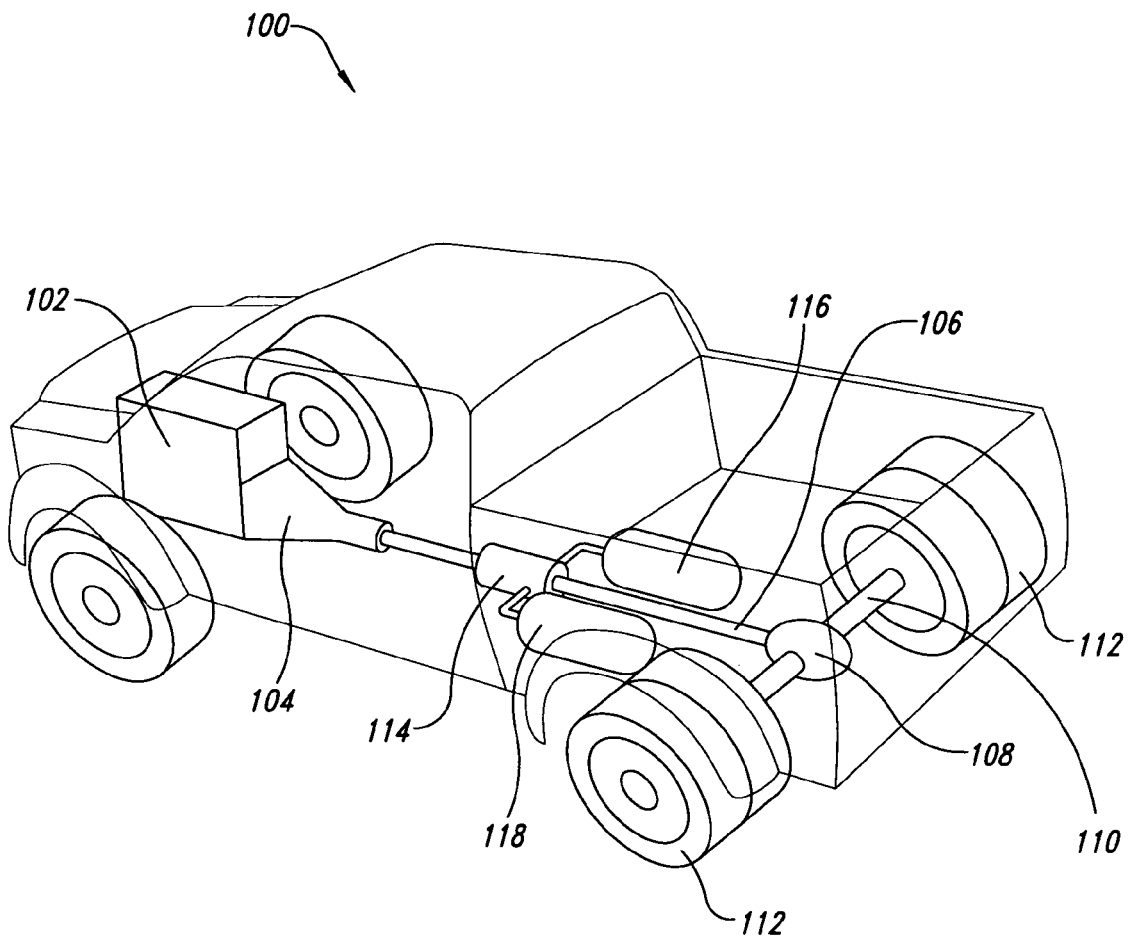
FIG. 1 shows a vehicle with a launch assist system, according to known art.
Figure 2:
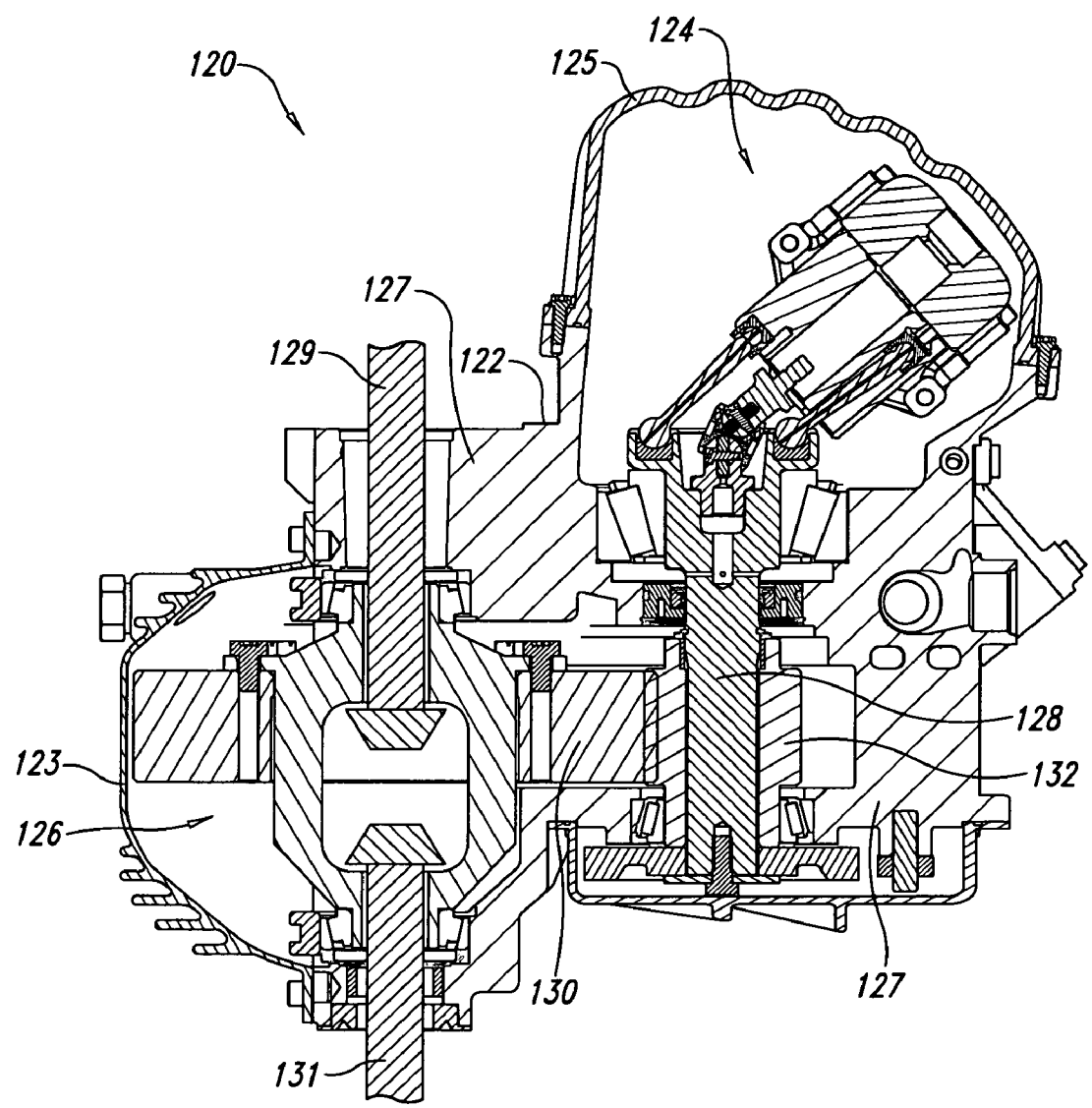
FIG. 2 shows, in cross section, an integrated drive module, according to an embodiment of the invention.

FIG. 2 illustrates the principles of the invention, according to a first embodiment. As illustrated in FIG. 2, a pump/motor 124 and a differential 126 are incorporated into a common housing 122. The housing 122 includes a differential cover 123, a pump/motor cover 125, and a support frame 127. The output shaft 128 of the pump/motor carries a drive gear 132.

The drive gear 132 directly engages the ring gear 130 of the differential 126, which is coupled to right and left segments 129, 131 of a vehicle axle.

By incorporating the pump/motor 124 and the differential 126 within a common housing, several advantages are realized. First, the casing 122 of the integrated pump/motor/differential module 120 weighs less than the combined casings of a conventional pump/motor and differential. Second, by incorporating a common support frame 127, the coupling between the pump/motor 124 and differential 126 is more secure and rigid than would be the case given a more conventional coupling. Third, because the drive gear 132 on the output shaft 128 directly engages the ring gear 130 of the differential 126, there is no need for a separate input or pinion shaft for the differential 126. Fourth, the hydraulic fluid that powers and lubricates the pump/motor may also provide lubrication for the differential. Finally, because the coupling between the pump/motor 124 and the differential 126 is very short and direct, intermediate coupling mechanisms, such as drive shafts, universal joints, or gears are also eliminated, thus further reducing weight and volume, and eliminating drag that might be contributed by these coupling components.

The term "passenger vehicle," as used in this specification, may be understood to refer to a vehicle configured to carry a driver, or operator, and at least one passenger.

In designing a transmission and shifting scheme for operation of a passenger vehicle, one must pay attention to various objectives and requirements for the design. For example, one primary objective in the design is to acceptably meet the high load, low speed performance requirements of the vehicle (e.g., as in initial acceleration). As a result, commercially acceptable passenger vehicles must be capable of providing a relatively high gear ratio, such as approximately 3:1 or more for relatively large vehicles such as SUVs and trucks. In addition, in order to maximize fuel economy for passenger vehicles at lower load and higher speed conditions, the transmission should, of course, also provide for an approximate 1:1 direct drive gear ratio. For performance and fuel economy objectives for the vehicle, these two respective forward gear ratios are generally sufficient to meet the particular objectives at hand.

However, a third necessary design objective also comes into play, which has resulted in a prevailing need in the prior art for multi-speed transmissions with more than just two forward speeds. In particular, the third objective in designing a transmission and shifting scheme for a commercially acceptable passenger vehicle is that the transition between gears must be smooth, without any harsh jerk felt by the driver or passenger in shifts. For this reason, in a conventional passenger vehicle, an increase in gear ratios between successive gears utilized for the vehicle is generally less than double the ratio for the previous gear (e.g., 1:1 to 2:1 or less), and frequently much less, to avoid unacceptable harshness in shifting. As a result, conventional multi-speed transmissions for passenger vehicles require more than just two forward speeds to obtain good driveability, mandating greater transmission cost, size, and complexity, and decreasing the potential fuel efficiency of the vehicle through the inability to quickly and directly shift between the vehicle's optimal high and low gear shift ratios.

Figure 3:
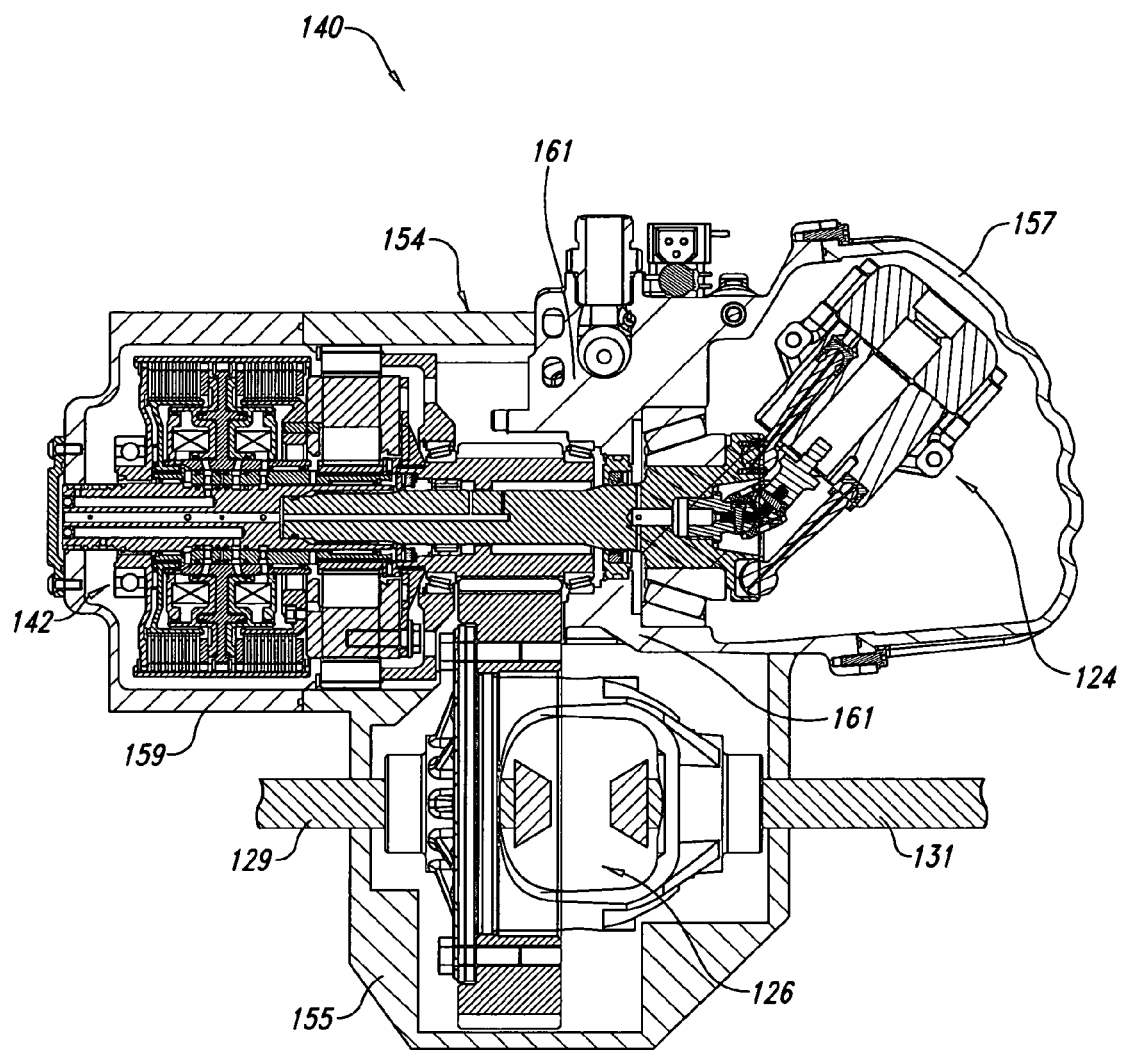
FIG. 3 shows, in cross section, an integrated drive module, according to another embodiment of the invention.

FIG. 3 illustrates an integrated drive module 140 according to another embodiment of the invention. In addition to the pump/motor 124 and differential 126, as described with reference to FIG. 2, the drive module 140 includes a transmission 142.

The transmission 142 of the embodiment of FIG. 3 is a two-speed automatic transmission of a planetary gear box type with two forward ratios and a geared neutral. Because the pump/motor 124, unlike typical internal combustion engines, is capable of operating in forward and reverse, it is not necessary for the transmission 142 to include a reverse gear, thus reducing the necessary size of the transmission. Transmissions of other types and designs may also be incorporated, according to the principles of the invention.

For example, because the pump/motor 124 can destroke to a zero displacement configuration, in which no torque is contributed by the pump/motor 124 to the drive train, a geared neutral is not essential, according to the principles of the invention. The pump/motor at zero displacement with low pressure to each port provides an effective neutral with low frictional drag.

However, by providing the geared neutral in the embodiment of FIG. 3, even the minimal drag added by the pump/motor 124 is eliminated, while in neutral. Thus, the integrated drive module 140 may be used in applications where the module 140 is not a primary drive device, and so may be offline for extended periods. In such an application, the added expense and weight of the geared neutral is offset by the savings in fuel economy afforded by the elimination of the drag, and the reduced wear of the pump/motor while in neutral.

In addition, the drive module 140 does not require a clutch between the pump/motor 124 and the transmission, to allow dynamic shifting from a first gear to a second gear. During a gear shifting event the pump/motor 124 is destroked to zero displacement to temporarily reduce the amount of torque supplied by the pump/motor 124 during the shifting event. Following the shift, the pump/motor 124 is restroked to the displacement needed for the desired torque in the second gear. Since the rotating inertia of the pump/motor 124 is similar in magnitude to that of a conventional clutch assembly for a similar size/torque drive system, simple synchronizers on the transmission gears, which are well known in the art, may be used to allow smooth and rapid gear changes.

The pump/motor 124, differential 126, and transmission 142 are integrated within a single housing 154, comprising several component parts, including differential and pump/motor covers 155, 157, a transmission cover 159 and a main support frame 161. The same hydraulic fluid required for operation of the pump/motor may also be used for operation of the transmission, as well as for lubrication of the differential.

As with the embodiment of FIG. 2, the embodiment depicted in FIG. 3 provides the advantage of reducing size, weight, and drag as compared with conventional assemblies in which individual components are independently mounted to a vehicle frame, and coupled together via external mechanisms.

Figure 4:
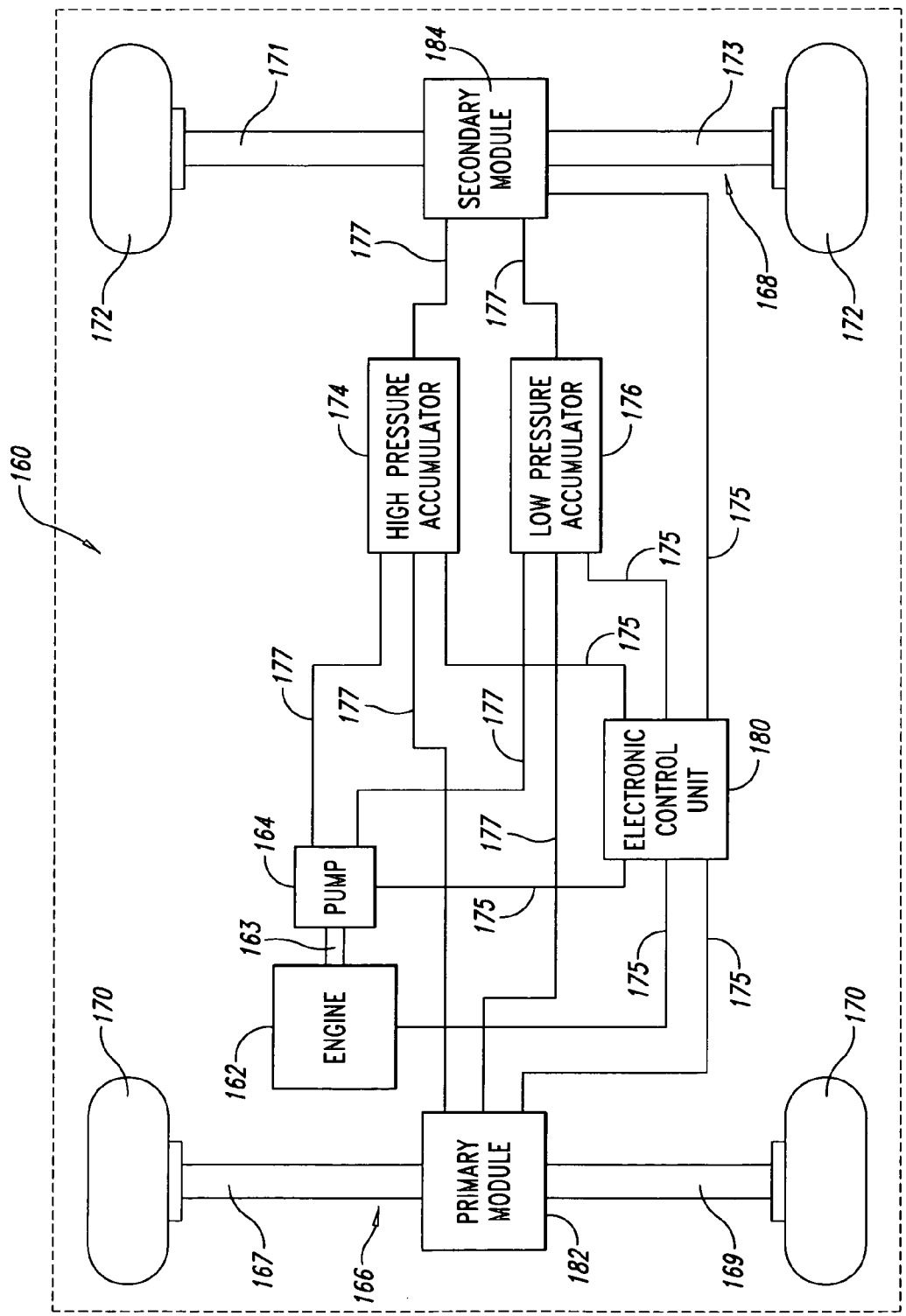
FIG. 4 shows, diagrammatically, a system according to an embodiment of the invention.

According to an embodiment of the invention, as illustrated in FIG. 4, a vehicle 160 is provided. The vehicle 160 includes an internal combustion engine 162 coupled via a crankshaft 163 to a pump/motor 164. The engine 162 is configured to drive the pump/motor 164, pumping fluid from a low pressure accumulator 176 to a high pressure accumulator 174. A primary integrated drive module 182, similar to drive module 120 of FIG. 2, incorporating a pump/motor and differential, is coupled to a primary drive axle 166 comprising first and second axle shafts 167, 169, which are in turn coupled to respective primary drive wheels 170. A secondary integrated drive module 184, similar to drive module 140 of FIG. 3, incorporating a pump/motor, differential, and transmission, is coupled to a secondary drive axle 168, comprising third and fourth axle shafts 171, 173, which are in turn coupled to respective secondary drive wheels 172.

An electronic control unit 180 (ECU) is configured to monitor various operations and parameters, such as vehicle speed, engine speed, and fluid levels in each of the high and low pressure accumulators 174, 176, as well as operating parameters of the pump/motor 164 and the primary and secondary integrated drive modules 182, 184. The ECU 180 is further configured to control fluid valves, which in turn control the operation of the pump/motor 164 and the pump/motors of the first and second integrated drive modules 182, 184. The electronic control unit 180 may also be configured to monitor vehicle operating parameters such as accelerator position, brake position, and selection lever position, the selection lever being used by a vehicle operator to select forward and reverse operation of the vehicle, for example. In addition, the ECU 180 may also be configured to control the throttle position of the engine 162.

Fluid connections between components are shown generally as fluid transmission lines 177, while connections between the ECU 180 and the various components are shown as control lines 175. Additionally, valve circuits are not shown. It will be recognized that in practice there may be multiple fluid lines, data and control cables, sensors, valve blocks and other devices for proper operation of the system. Such devices are well known in the art, and are therefore not described in detail.

The functions described as being performed by the ECU 180 do not have to be centralized as shown, but may be shared or distributed among several components of the vehicle 160, or multiple ECU's. Additionally, some of the monitor and control functions described as being performed by the ECU may not, in all embodiments, be electronic in nature. For example, mechanical, pneumatic, hydraulic, and chemical control and feedback systems may be employed. All such variations are considered to fall within the scope of the invention.

In operation, according to the embodiment illustrated in FIG. 4, the primary integrated module 182 is sized and configured to provide adequate power to operate the vehicle 160 during normal operating conditions. For example, when operating at a steady speed on a level, or descending grade, the secondary drive module 184 is in a neutral configuration, providing no additional motive power to the vehicle 160. When the operator of the vehicle 160 requires acceleration or demands a greater output of power than the primary module 182 is capable of producing, the ECU 180 directs the secondary integrated drive module 184 to engage and provide the necessary additional power. Based upon the speed of the vehicle, and the power requirement, the ECU 180 may select either the first or the second gear of the transmission of the second integrated drive module 184.

For example, when starting from a dead stop, both drive modules 182, 184 may be engaged to provide the necessary acceleration, with the secondary drive module 184 in first gear. As the vehicle 160 accelerates and passes through a threshold where the secondary drive module 184 operates more efficiently in the second gear, the ECU 180 will direct the transmission of the secondary drive module 184 to shift into the second gear, for continued smooth acceleration. When the vehicle 160 reaches a cruising speed, and the power demand drops to within the capability of the primary module 182, or through a selected threshold, the transmission of the secondary module 184 is returned to a neutral configuration. As previously explained, a geared neutral allows the pump/motor of the secondary drive module 184 to be taken completely offline, such that even the minimal drag of the fully destroked motor is eliminated.

The ECU 180 also controls the stroke angle of the pump/motors of the primary and secondary drive modules 182, 184, selecting a stroke angle appropriate to the current demand for power, and the output capacity of the respective pump/motors.

During a braking operation, the ECU 180 directs the primary integrated drive module 182 to reverse fluid flow, as described with reference to the pump/motors in the background section, to act as a regenerative brake, drawing fluid from the low pressure accumulator 176 and moving that fluid at high pressure into the high pressure accumulator 174. During regenerative braking, the second integrated drive module may be placed in a neutral configuration.

Because a pump/motor is capable of much greater low end torque, compared to its maximum torque, than an internal combustion engine, it is capable of smoothly shifting between much more disparate gear ratios. For example, a vehicle employing a system such as that described with reference to FIG. 4 may shift between a 1:1 gear ratio and a high gear ratio (e.g., 3:1) with just one transmission step change, thereby eliminating the prior art need in passenger vehicles for intermediate gear ratios to smoothly effect such transitions in a commercially acceptable manner. In this way, the cost and complexity of a transmission may be reduced, as compared to a conventional vehicle with similar load and performance capabilities.

In order to effect a smooth gear change, the ECU 180 destrokes the pump/motor of the secondary module 184 to zero displacement, shifts the transmission from first to second gear, then restrokes the pump/motor to an angle selected to substantially match the level of acceleration present just prior to destroking. From this point, the stroke angle may be smoothly increased to increase acceleration, based upon the accelerator position selected by the vehicle operator.

While the principles of the invention are described and illustrated with reference to a two speed transmission, the scope of the invention is not limited to two speed transmissions, but also includes transmissions having three or more speeds. For example, the principles of the invention may be practiced to advantage in a transmission using three forward speeds in an application that might otherwise require five, in a conventional vehicle.

It is known that internal combustion engines, while capable of meeting a wide range of speeds and loads, typically have ranges of speed and load levels at which they operate at highest efficiency. That is to say, there are speed and load levels at which the most power is produced per unit of fuel consumed. The vehicle 160 may be configured to operate such that the engine 162, controlled by the ECU 180, drives the pump/motor 164 within a range of efficient speeds and loads, regardless of the power demanded by the operator of the vehicle 160. The size and capacity of the engine 162 is selected to meet or exceed the average power requirements of the vehicle 160, within the engine's most efficient operating range.

Accordingly, under most conditions, the engine 162 operates within its most efficient range of speeds, driving the pump/motor 164 to pump fluid from the low pressure accumulator 176 to the high pressure accumulator 174, which is then used as required to drive the vehicle 160. The ECU 180 may be configured to shut down the engine 162 in the event that the high pressure accumulator 174 becomes fully charged, such as when the vehicle 160 is operated for an extended period at less than its average power consumption.

Alternatively, in the event that the vehicle 160 exceeds its average power requirements, the ECU 180 may be configured to advance the throttle of the engine 162 to a speed outside its most efficient range of operating speeds, but within its power capabilities, when the fluid level in the high pressure accumulator 174 drops below a selected threshold.

Inasmuch as the engine 162 is not required to be capable of the power output levels that would be necessary to provide the short term acceleration or power demanded for normal driving conditions, the engine 162 may be of significantly lower capacity than would be necessary for a vehicle of similar size and power output, given a conventional power train. The engine 162 need only be capable of meeting, within its most efficient range of operating speeds, the average demands of the vehicle 160, while being capable of operating somewhat above those average demands when necessary. Thus, the size of the engine 162 may be reduced, as compared to a conventional vehicle, thereby reducing the overall weight of the vehicle, further improving fuel economy.

The ECU 180 is configured to control the stroke angle of the pump/motors of the primary and secondary drive modules 182, 184, the selection of the drive gear of the transmission of the secondary drive module 184, and the power output of the engine 162, based upon selected parameters. For example, the selection may be based upon maximum efficiency of operation, for the purpose of optimizing fuel economy and reducing emissions. Alternatively, the selection may be based upon best possible power output, for use in high performance vehicles. In another case, the selection may be based upon a requirement to minimize wear on the components of the system, or on a particular one of the components. The decisions made by the ECU 180 in controlling the various parameters of the system, and selecting thresholds for particular events, may be made using a variety of tools. For example, real time calculations based on sensor inputs, look-up tables, pre-established limits, and combinations of the above, may all be employed.

According to an embodiment of the invention, a manual override is provided, such that a vehicle operator may engage the secondary drive module full time, for four-wheel-drive operation. Unlike conventional four-wheel-drive vehicles, the vehicle 160 of FIG. 4 does not require a differential between the front and rear axles, further reducing the mass and complexity of the vehicle 160, as compared to a conventional vehicle. Thus, in addition to use in passenger vehicles and light duty trucks, the system described with reference to FIG. 4 is ideal for use in light sport-utility and off-road vehicles.

Figure 5:
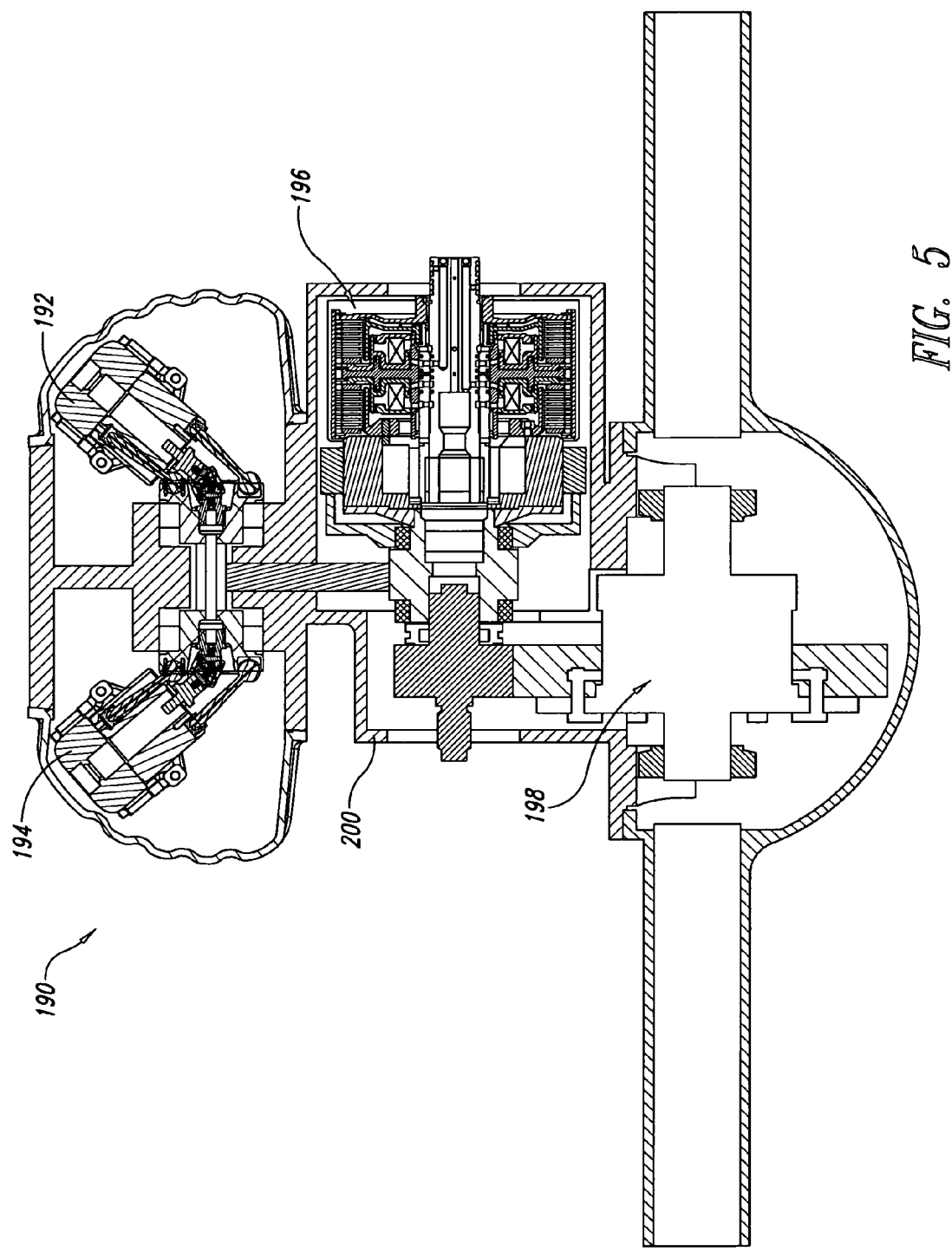
FIG. 5 shows, in cross section, an integrated drive module, according to another embodiment of the invention.

FIG. 5 illustrates an integrated drive module 190 according to another embodiment of the invention. The integrated drive module 190 includes first and second opposing pump/motors 192, 194, two-speed transmission 196, and differential 198 (details of the differential are not shown). The integrated drive module 190 includes a casing 200, configured to enclose the various components thereof in a manner similar to that described with reference to previous embodiments.

The opposing pump/motors 192, 194 are configured to operate in tandem, namely, they are coupled together such that the stroke angle of each pump/motor 192, 194 is substantially equal to that of the other. Thus, axial forces generated within each pump/motor are largely canceled by those generated by the opposite pump/motor. A detailed description of the structure and operation of opposing pump/motors of the type illustrated in FIG. 5 may be found in U.S. patent application Ser. No. 10/620,726, which is incorporated herein by reference, in its entirety.

One advantage of opposing pump/motors such as those shown in the embodiment illustrated in FIG. 5, is that, for a total given maximum displacement, two synchronized pump/motors in opposition, such as those shown in the drive module 190 of FIG. 5, have a lower total mass and size than would a single pump/motor having an equivalent maximum displacement. Accordingly, an application requiring a greater maximum power output than can be provided by drive modules of previously described embodiments may employ the drive module 190 of FIG. 5, which, given an equal, or slightly greater mass, is capable of a much higher maximum output.

One application of the integrated drive module 190 of FIG. 5, is in a vehicle such as that described with reference to FIG. 4, in place of the secondary drive module 184, where the vehicle is a medium duty vehicle requiring a greater maximum output, such as a larger sport-utility vehicle or truck.

Figure 6:
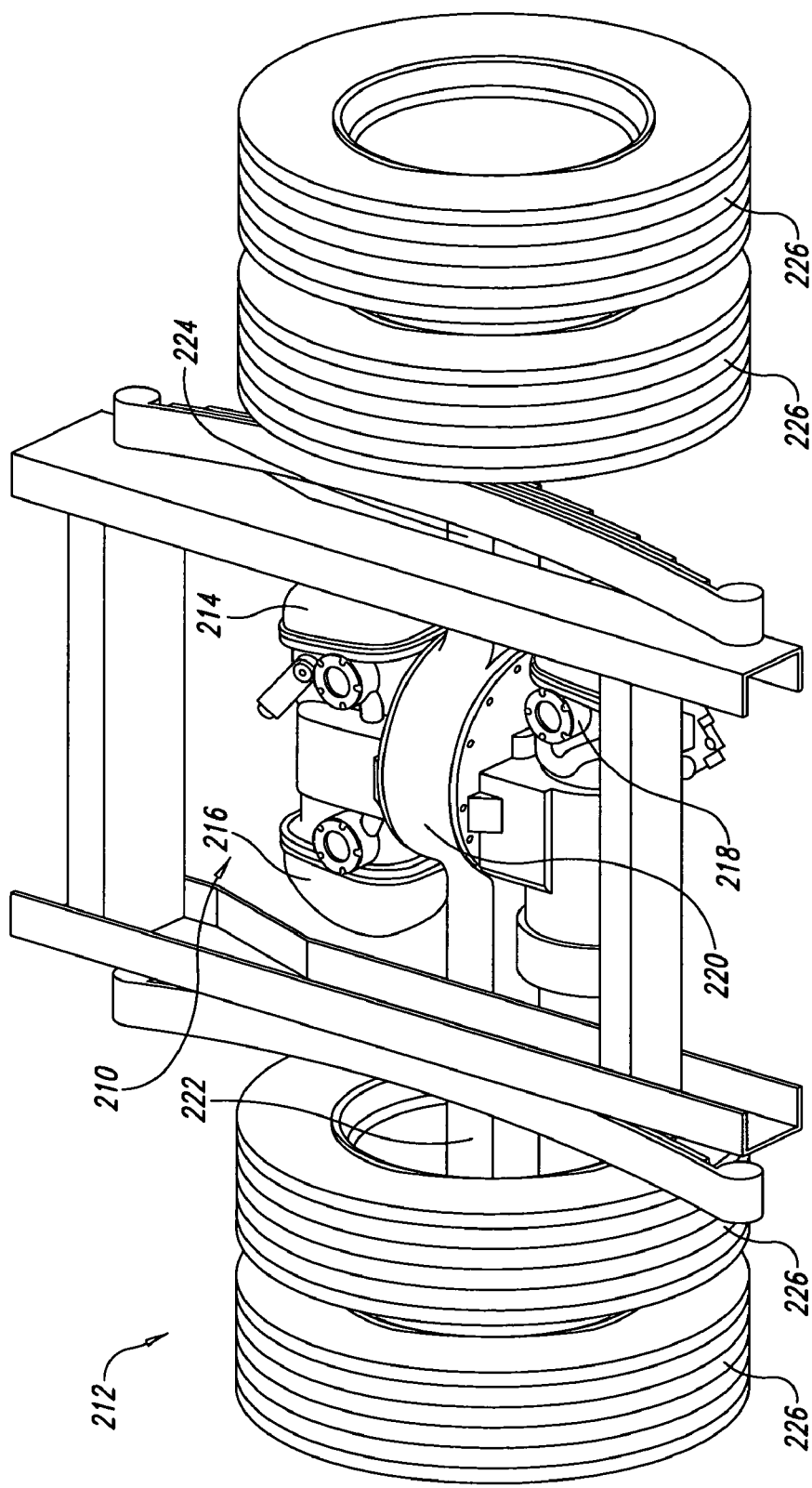
FIG. 6 shows a portion of a truck chassis, rear axle assembly, and a drive module according to another embodiment of the invention.

FIG. 6 illustrates an integrated drive module 210 and rear axle assembly 212 of a vehicle according to another embodiment of the invention. Integrated module 210 includes first, second, and third pump/motors 214, 216, 218, and differential 220. The differential 220 is coupled to first and second axle shafts 222, 224, which are in turn coupled to drive wheels 226.

Functionally, the integrated drive module 210 operates in a manner similar to a combination of the primary and secondary integrated drive modules 182, 184, as described with reference to FIG. 4. For example, if the vehicle associated with the integrated drive module 210 and rear axle assembly 212 is cruising at a fixed speed, only the pump/motor 218 may be engaged and providing motive power to the vehicle, while the first and second pump/motor 214, 216 remain in a neutral configuration. Alternatively, when additional power is required, such as for acceleration or for climbing an incline, the first and second pump/motors 214, 216 are engaged to provide additional motive force, as required. It may be seen that, in the configuration illustrated in FIG. 6, the first and second pump/motors 214, 216 are in an opposing configuration, similar to that described with reference to the integrated drive module 190 of FIG. 5, and so enjoy similar advantages.

The integrated drive module 210 may be advantageously employed to provide motive power to larger vehicles, such as larger trucks or step vans of the type used for collecting and distributing freight items in urban areas, trucks used to collect refuse, tow trucks, and other large vehicles employed in urban environments.

It will be recognized that, while the various embodiments of the invention have been described with reference to a yoked bent-axis pump/motor, there is a wide variety of pump/motor types that may be used in connection with the embodiments of the invention. For example, other types of pump/motors include the sliding valve plate bent-axis pump/motor, the swash plate pump/motor, the wobble plate piston pump/motor, and the radial piston pump/motor. These and other hydraulic motor devices are considered to fall within the scope of the invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of operating a vehicle, comprising:
   changing a displacement of a first pump/motor encased within a machine casing;
   changing torque applied to an output shaft of the first pump/motor in response to the change in displacement;
   changing rotation of a ring gear of a first differential coupled to the output shaft and encased within the machine casing in response to the change in torque;
   changing from a first gear to a second gear of a transmission encased within the machine casing and coupled between the output shaft and the ring gear; and
   distributing rotational force to axle segments of a first axle coupled to the first differential.

2. The method of claim 1, further comprising comparing a power demand with a selected threshold, and wherein the changing from the first gear step is performed when the power demand exceeds the selected threshold.

3. A method of operating a vehicle, comprising:
   comparing a power demand with a selected threshold;
   changing a displacement of a first pump/motor encased within a first machine casing;
   changing torque applied to an output shaft of the first pump/motor in response to the change in displacement of the first pump/motor;
   changing rotation of a ring gear of a first differential coupled to the output shaft of the first pump/motor and encased within the first machine casing in response to the change in torque applied to the output shaft of the first pump/motor;
   distributing rotational force to axle segments of a first axle coupled to the first differential to provide motive power to the vehicle;
   changing displacement of a second pump/motor encased within a second machine casing;
   changing displacement of the second pump/motor when the power demand exceeds the selected threshold;
   changing torque applied to an output shaft of the second pump/motor in response to the change in displacement of the second pump/motor;
   changing rotation of a ring gear of a second differential coupled to the output shaft of the second pump/motor and encased within the second machine casing in response to the change in torque applied to the output shaft of the second pump/motor; and
   distributing rotational force to axle segments of a second axle coupled to the second differential.

4. A method for operating a hydraulic hybrid vehicle, comprising:
   sensing an increase in demand for motive power from the vehicle;
   applying an increased amount of torque from a hydraulic motor to an output shaft of the motor, responsive to the increased demand for motive power;
   transmitting the torque from the output shaft of the hydraulic motor to a differential through an operatively connected multi-speed transmission engaged in a first gear ratio;
   distributing the torque to right and left drive axle segments of the vehicle through the differential, said differential enclosed within a common housing with the hydraulic motor and multi-speed transmission, said housing being attached to the vehicle;
   destroking the hydraulic motor for a selected time interval to temporarily reduce the amount of torque supplied by the hydraulic motor during that time interval;
   changing the gear ratio of the multi-speed transmission from the first gear ratio to a second gear ratio in conjunction with said time interval; and
   restroking the hydraulic motor to again increase the amount of torque supplied by the hydraulic motor responsive to a continued demand for motive power from the vehicle.

5. The method of claim 4, wherein the multi-speed transmission is a two-speed transmission.

6. The method of claim 5, wherein the first gear ratio is greater than 2:1 and the second gear ratio is approximately 1:1.

7. The method of claim 5, wherein the first gear ratio is approximately 3:1 and the second gear ratio is approximately 1:1.

8. The method of claim 7, wherein the changing of the gear ratio from approximately 3:1 to approximately 1:1 occurs in combination with restroking the hydraulic motor, resulting in substantially the same amount of torque transmitted to the differential as just before the destroking step.

9. The method of claim 8, wherein the changing of the gear ratio occurs smoothly with just one transmission step change.

10. The method of claim 4, further comprising thereafter decoupling the hydraulic motor from the differential upon a decrease in the demand for motive power from the vehicle to below a preselected threshold level.

11. The method of claim 4 wherein the restroking step comprises:
    restroking the hydraulic motor, immediately following the step of changing the gear ratio, to a displacement resulting in substantially the same amount of torque transmitted to the differential as just before the destroking step; and
    subsequently increasing the torque from the hydraulic motor in response to a continued demand for increased motive power from the vehicle.

* * * * *